Figure 4:
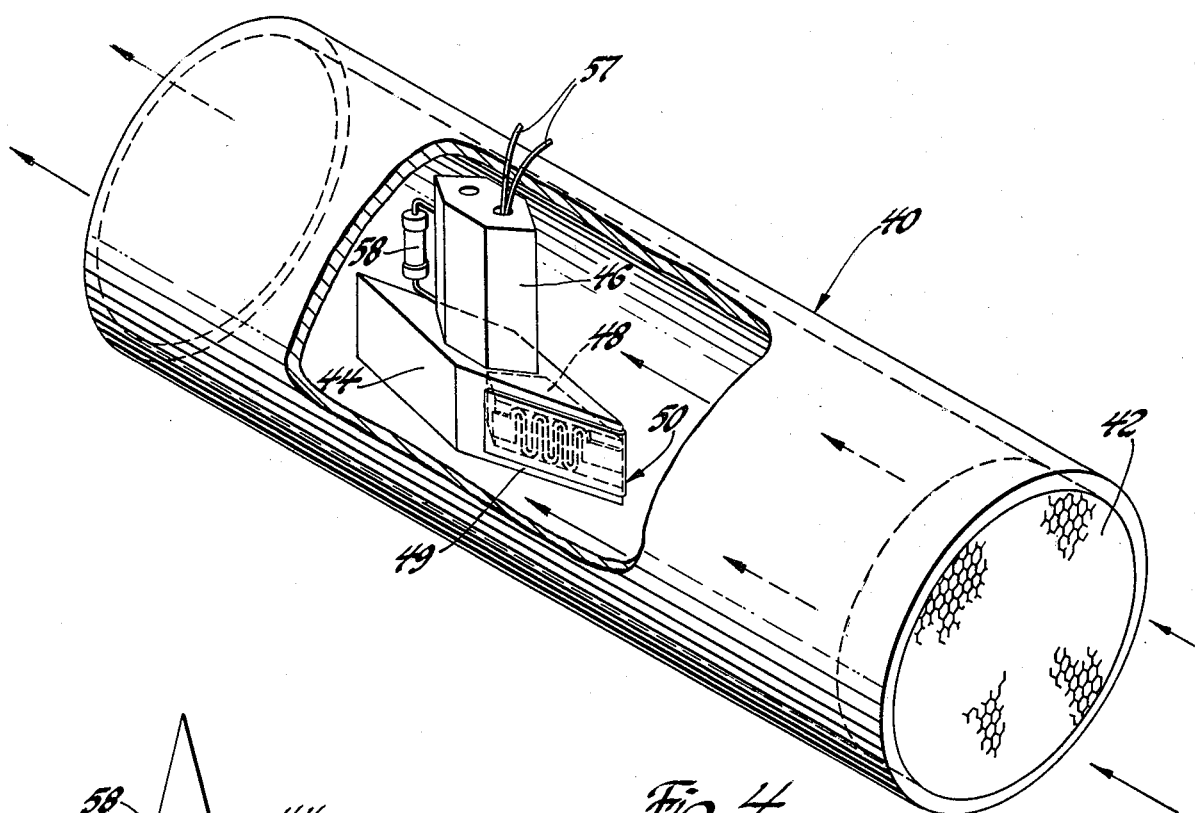

United States Patent [19]

Shih et al.

[11] 4,433,576
[45] Feb. 28, 1984

[54] MASS AIRFLOW SENSOR

[75] Inventors: Kelvin Shih, Brighton; Kurt A. Pochert, Hartland, both of Mich.; James M. Dunford, Cupertino, Calif.

[73] Assignee: General Motors Corporation, Detroit, Mich.

[21] Appl. No.: 419,937

[22] Filed: Sep. 20, 1982

[51] Int. Cl.³ .............................................. G01F 1/68
[52] U.S. Cl. ...................................................... 73/204
[58] Field of Search ........................ 73/204; 338/25, 28

[56] References Cited

U.S. PATENT DOCUMENTS

| | | | |
|---|---|---|---|
| 2,870,305 | 1/1959 | Ling | 73/204 |
| 4,294,114 | 10/1981 | Lauterbach | 73/204 |
| 4,304,130 | 12/1981 | Peter et al. | 73/204 |
| 4,317,365 | 3/1982 | Lauterbach | 73/204 |

Primary Examiner—Herbert Goldstein
Attorney, Agent, or Firm—Warren D. Hill

[57] ABSTRACT

An airflow sensor for a constant temperature anemometer comprises a copper foil resistor mounted on a polyimide foil which is supported in the airstream to be measured. The support preferably is a flat frame having an aperture over which the foil sensor is mounted so that the airstream can strike the sensor on both sides of the film. Airflow directors mounted upstream of the sensor are placed at an angle to direct the airstream toward each side of the film at a definite angle to obtain a positive cooling effect of the film by the airstream and consistent airflow. The sensor assembly is mounted in a duct with the plane of the sensor along the longitudinal axis of the duct for measurement of the flow through the duct. Another embodiment has a diamond shaped body mounted in an airflow such that a straight airflow impinges upon two forward sides of the body at a specific angle. A dielectric film mounted on the forward surfaces supports a metal film resistor on each face and a cavity in the body intersects the forward faces in the region of the metal film to isolate the film from the mass of the body to minimize the thermal mass of the sensor resistor element.

8 Claims, 6 Drawing Figures

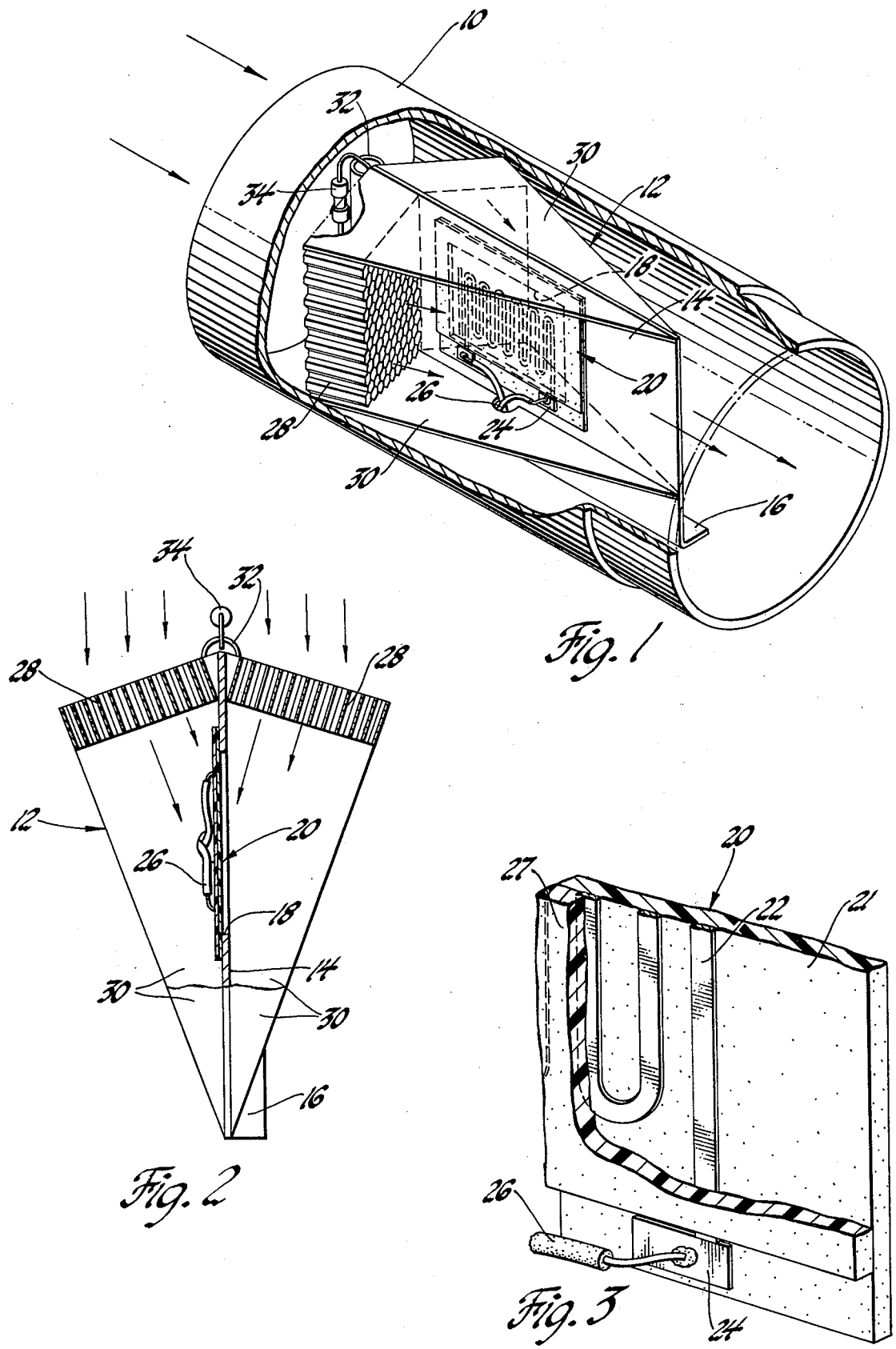

MASS AIRFLOW SENSOR

This invention relates to mass airflow sensors and in particular to such a sensor of the constant temperature heated resistor variety.

It is useful, for example, in automotive vehicle engine control to measure the mass airflow to the induction bore of an engine. In order to accurately control the flow of fuel to the engine it is necessary that the mass airflow be accurately known. It has been the practice to indirectly determine the mass airflow by measuring barometric pressure, manifold pressure, engine RPM, temperature, etc. and calculating the airflow. While statisfactory results can be obtained from such systems, expensive transducers are required to gather the input data. Previous attempts to make mass airflow measurements have had various shortcomings. For example, a well-known vortex type meter utilizes an obstacle in the air stream to generate vortices and a transducer such as a hot wire sensor measures the frequency of the vortices which is a direct measure of air velocity. However, to obtain mass airflow it is also necessary to measure the air pressure and temperature in order to determine the air density. In addition, the vortex type meters are not suited to the wide dynamic range of airflow experienced in automotive engines. That is, a meter designed for operation at the high flow rates experienced in an engine are inoperative to measure the lowest flow rates experienced and vice versa. Another type of meter is the hot wire meter comprising a resistance bridge which includes a fine wire platinum resistor in one of the arms which is the air mass flow sensor element. The bridge is supplied with power sufficient to maintain the sensor resistor at a given temperature above ambient air temperature and the bridge voltage or the power dissipated in the resistor are measures of the air mass flow. In principle this hot wire analog meter is sound and provides good results. In practice, however, contamination of the wire surface by dirt buildup greatly changes the cooling effect of the air so that the system calibration is erroneous. Thus, frequent cleaning of the wire is necessary. Also, experience indicates that the fine sensor wire is subject to breakage incidental to engine backfire. Still another proposal using the same analog hot wire approach achieves a rugged sensor by winding the wire on a core. Such a sensor, however, has a high thermal mass due to the core so that the temperature of the resistor element responds slowly to changes in mass airflow of the air stream and thus falls short in the automotive vehicle application where rapid temperature changes and rapid airflow changes are frequently encountered. The term "thermal mass" of the film resistor element is used herein to refer to that heat capacity of the sensor resistor itself combined with the heat capacity of the film support structure in intimate heat transfer relation with the sensor resistor which together effectively retard changes in the sensor resistor temperature upon changes in mass airflow.

It is, therefore, an object of this invention to provide a mass airflow sensor which is accurate, rugged, useful over a wide dynamic range of flow rates, has rapid response to flow rate changes and is substantially unaffected by dirt buildup.

The invention is carried out by providing a mass airflow sensor formed as a metal film resistive element supported on a dielectric film in an airflow converging toward the film wherein the sensor has a small thermal mass and responds quickly to mass airflow changes. More particularly, the invention is carried out by such a planar resistive film sensor which is exposed on both sides of the film to the air stream which directed at an oblique angle to each side and converges at the film sensor for maximum cooling effect by the air.

Figure 5:
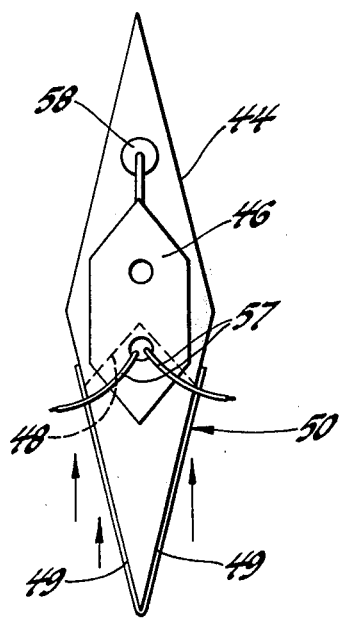
Figure 6:
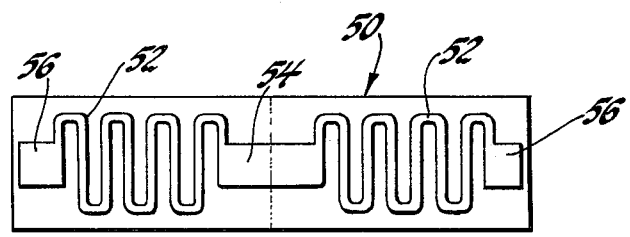

The above and other advantages will be made more apparent from the following specification taken in conjunction with the accompanying drawings wherein like reference numerals refer to like parts and wherein:

FIG. 1 is a partly broken away isometric view of a mass airflow sensor according to the invention, FIG. 2 is a cross-sectional view of the sensor of FIG. 1 illustrating the airflow pattern therein, FIG. 3 is a partly broken away isometric view of the sensor element of the sensor of FIG. 1, FIG. 4 is a partly broken away isometric view of a mass airflow sensor according to another embodiment of the invention, FIG. 5 is a plan view of the body of the sensor of FIG. 4, and FIG. 6 is a developed view of the metal film sensor resistor of the sensor of FIG. 3.

The mass airflow sensor according to this invention is of the constant anemometer type referred to above. That is, for any given ambient air temperature the sensor resistor is held at a constant temperature above the ambient temperature even though the flow rate may vary. For example, if the ambient air temperature is 20° C., the sensor resistor may be held at 100° C. The sensor resistor is in a Wheatstone bridge arrangement with other resistors including a compensating resistor which is sensitive to the ambient air temperature. The bridge is supplied by a power supply which is controlled by a feedback circuit to maintain a sufficient voltage across the bridge that the sensor resistor will be at its required temperature irrespective of the varying power dissipation from the resistor caused by changes in the mass airflow. The resulting bridge voltage or the power dissipated provides a measure of the mass airflow. Such arrangements are well known to those skilled in the art and a further description of the system will not be given here.

The preferred embodiment of the invention is set forth in FIGS. 1, 2 and 3, and while it has general application to mass airflow measurements, it is specifically designed for the measurement of mass airflow inducted into an automotive internal combustion engine and thus is adapted for operation over a wide dynamic range of airflow, over a wide ambient temperature range and able to withstand vibration, dirt and engine backfire shocks.

A cylindrical duct 10 contains a sensor 12 which includes a support frame 14 which is generally planar and has along one edge thereof a flange portion 16 for mounting to a wall of the duct 10. In practice, the duct 10 and frame 14 have been made of aluminum or a molded polymer with equally successful results. The frame extends longitudinally in the duct and lies on the duct central axis. A rectangular aperture 18 in the frame 14 is also symmetrically positioned with respect to the duct axis. A planar film resistor element 20 slightly larger than the aperture 18 is adhesively supported at its margins on the frame 14 over the aperture. The body of the element 20 is a dielectric film 21 which is preferably an aromatic polyimide film such as Kapton (trademark of E. I. duPont de Nemours & Co., Inc.) which supports a metal film sensor resistor 22 directly over the aperture and spaced from the edges thereof. The polyimide film is strong and flexible, it exhibits low heat transfer laterally and has high temperature stability. The metal film resistor 22 is smaller in area than the dielectric film 21 and is spaced from the edges of the film 21 to define the margins thereof. The metal film resistor has a substantial change of resistivity with temperature and preferably has a linear characteristic. In practice it has been found that the optimum material is copper secured to the dielectric film and etched in a serpentine pathway to achieve the desired resistance, say 5 ohms at a temperature of 95° C. In a range of −200° C. to +300° C. the resistance changes linearly with temperature and has a value of 3.8619 ohms at 20° C. Thus the resistor has a substantial change of resistivity with temperature. Each end of the resistive pathway then terminates at a solder pad 24, each pad, in turn, being connected by conductive leads 26 to the airflow circuit. A specific example of one such sensor which had an aperture of about one inch square used a one mil thick Kapton substrate with one quarter ounce copper foil adhered to one side. An area of 0.75 inch by 0.3 inch etched into a serpentine shaped circuit developed the required resistance. The copper resistance path was 0.38 mil thick and 10 mils wide. The copper surface was protected by another film 27 of dielectric material such as another sheet of Kapton one mil thick adhesively secured to the substrate, although other dielectric coatings can be used. The resulting encapsulation of the copper resistor prevents oxidation and also presents a smooth surface to the airflow to diminish any tendency to collect dirt on the sensor resistor surface. The thermal mass of the sensor resistor element 20 is kept low due to the small mass of the copper-Kapton assembly and its very effective insulation from the support frame 14, while the cooling area encompassing both sides of the planar element 20 is large.

On each side of the frame 14 upstream of the sensor 20 an aluminum honeycomb flow straightener 28 extends from the frame toward the wall of the duct 10 and is placed at such an angle relative to the frame that air will flow through the flow straighteners 28 in two airflow path converging toward the film and will impinge upon both sides of the metal film sensor resistor 22. The flow straighteners 28 are supported by upper and lower supports 30 which extend along opposite sides of the flow straighteners and along the frame, each support coming to a point at the downstream end of the frame 14 thereby assuming a kite-shaped configuration. Preferably each flow straightener is at an angle of about 70° to the plane of the frame 14. The optimum angle of the flow straighteners is determined empirically for a given design. Experience has shown that the angle is not critical and may be varied, say, 10° either way from the nominal 70° position. If the angle is too large, however, the resolution of the sensor deteriorates whereas a smaller angle tends to restrict airflow through the duct 10. The convergent airflow obtained by the flow straighteners tends to sweep away any insulating layer of air adhering to the sensor surface to improve thermal coupling of the airflow with the sensor to enhance sensor cooling. Also, this positive control of airflow enhances consistent airflow throughout a range of airflow conditions. In addition, the upper and lower supports 30 help sustain a consistent airflow by preventing interference of the air passing through the straighteners by that air which has bypassed the flow straighteners along the walls of the duct 10. A gap between the flow straighteners at the upstream side thereof is closed by a semicylindrical fairing 32 which helps to streamline the flow to the straighteners. The temperature compensating resistor 34 which is a part of the bridge circuit for the air meter is mounted adjacent the fairing 32 and upstream thereof. The resistor leads extend into the fairing 32 for routing to the electronic circuit. The positioning of the compensating resistor 34 is not critical so long as it is placed in a portion of the ambient air which has not been heated by the sensor resistor 22.

It will thus be seen that the mass airflow sensor as just described provides a rugged sensing element having a low thermal mass and a large area swept by the impinging air stream which converges on both sides of the sensing element to effect rapid response to changes in mass airflow. Further due to the large planar area of the sensing element, contamination thereof has little effect on the sensor operation. For example, a one mil coating of contaminants effects substantially no change in the cooling area of the flat metal film resistor. In contrast, if a prior art hot wire sensor which uses a round four mil diameter platinum wire collects a one mil coating of contaminants the cooling area of the wire will increase by 50% thereby causing severe calibration errors and requiring frequent cleaning of the wire. In addition, the use of copper for the resistance element eliminates any dependence on noble metals which are very expensive and can at times be difficult to obtain. The linearity of the copper with temperature helps to simplify the electronic circuitry of the meter which produces an electrical signal representing mass airflow.

The second embodiment of the mass airflow sensor as shown in FIGS. 4, 5 and 6 comprises a duct 40 having a flow straightener 42 in the upstream end for directing air axially along the duct. A diamond shaped body 44 preferably of dielectric material is suspended in the duct substantially at the longitudinal axis of the duct and is mounted on a streamlined pedestal 46 that is attached to the wall of the duct. The body 44 is positioned so that a sharp wedge shaped front portion is poised to cleave the oncoming air stream. As best shown in FIG. 5, the front portion of the body 44 contains a cavity 48 intersecting both front faces 49. The openings thus defined in the front faces are covered by a film resistor element 50 which, as best shown in FIG. 6, comprises a pair of metal film resistors 52 connected in series by a low resistance conductor 54 and terminating at their extreme ends in solder pads 56. The film resistor element is wrapped around the front portion of the body 44 so that the resistors 52 are facing inwardly and positioned over the openings in the front faces 49 and the conductor 54 traverses the front apex of the body 44. Leads 57 connected to the solder pads 56, are routed internally through hollow parts of the body 44 and pedestal 46 to an electronic circuit, not shown.

Thus the diamond shaped body 44 provides a smooth frontal area to the oncoming air stream and the large area resistors 52 readily dissipate their heat to that air stream thereby providing a rapid response to mass airflow changes. The inside of each resistor 52, of course, is exposed to a dead air space in the cavity 48 so that the effective cooling air is about one half that of the preferred embodiment of FIGS. 1–3 described above. Still the response of the sensor is good for many applications and has an advantage of simple construction and low expense. The fabrication of the film resistor element is substantially like that of the preferred embodiment although the protective film 27 is optional. A temperature compensating resistor 58 is placed at the trailing edge of the support pedestal 46. However, again that placement is not critical so long as it is exposed to air unheated by the film resistor element 50. It has been found in practice that an included angle of 20° between the front faces of the body 44 is satisfactory although larger angles have been tried with equally good results. It will thus be seen that variations on the preferred embodiment may be made while utilizing the film resistor element and maintaining the quality of high sensitivity, low thermal mass, low noise and rapid response.

The embodiments of the invention in which an exclusive property or privilege is claimed are defined as follows:

1. In a flow meter, a mass airflow sensor having a sensor resistor controlled to a determined temperature by a heating current, the improvement comprising:

a film resistor element including a dielectric film, and a metal film sensor resistor supported on the dielectric film, the dielectric film having mounting regions spaced from the metal film, the metal film having a substantial change of resistivity with temperature, support means for engaging the film resistor element at the said mounting regions with the sensor resistor spaced from the support means for thermal isolation from the support means whereby the resistor element has small thermal mass, and means for converging the flow of an airstream toward the film resistor element to obtain a consistent airflow at the resistor element and a positive cooling effect by the airstream.

2. In a flow meter, a mass airflow sensor having a sensor resistor controlled to a determined temperature by a heating current, the improvement comprising:

a film resistor element including a dielectric film, and a metal film sensor resistor supported on the dielectric film, the metal film sensor being smaller than the dielectric film and positioned thereon to define margins surrounding the metal film sensor, the metal film having a substantial change of resistivity with temperature, support means including means for engaging only the said margins of the dielectric film for mounting the film resistor element on the support means to afford thermal isolation from the support means whereby the resistor element has small thermal mass, and means for directing the flow of an airstream toward the film resistor element at an oblique angle thereto to obtain a consistent airflow at the resistor element and a positive cooling effect by the airstream.

3. In a flow meter, a mass airflow sensor having a sensor resistor controlled to a determined temperature by a heating current, the improvement comprising:

a film resistor element including a dielectric film, and a metal film sensor resistor supported on the dielectric film, the metal film having a substantial change of resistivity with temperature, support means having a hole therein, means for mounting the film resistor element on the support means with the sensor resistor over the hole and spaced from the support means for thermal isolation from the support means whereby the resistor element has small thermal mass, and means for directing the flow of an airstream toward the film resistor element at an oblique angle thereto to obtain a consistent airflow at the resistor element and a positive cooling effect by the airstream.

4. In a flow meter, a mass airflow sensor having a sensor resistor controlled to a determined temperature by a heating current, the improvement comprising:

a planar film resistor element including a dielectric film, and a metal film sensor resistor supported on the dielectric film the metal film having a substantial change of resistivity with temperature, a support frame having a hole extending therethrough, means for mounting the film resistor element on the support frame with the sensor resistor in a plane over the hole and spaced from the support frame for thermal isolation from the support frame whereby the resistor element has small thermal mass, and means for converging the flow of an airstream toward both sides of the film resistor element to obtain a consistent airflow at the resistor element and a positive cooling effect by the airstream.

5. In a flow meter, a mass airflow sensor having a sensor resistor controlled to a determined temperature by a heating current, the improvement comprising:

a planar film resistor element including a dielectric film, and a metal film sensor resistor supported on the dielectric film, the dielectric film having mounting regions spaced from the metal film, the metal film having a substantial change of resistivity with temperature, support means for holding the film resistor element in a plane at the said mounting regions with the sensor resistor spaced from the support means for thermal isolation from the support means whereby the resistor element has small thermal mass, and an airflow director on each side of the plane of the film resistor element for forming two airflow paths converging toward the film resistor element at an oblique angle thereto to obtain a consistent airflow at the resistor element and a positive cooling effect by the airstream.

6. In a flow meter, a mass airflow sensor having a sensor resistor controlled to a determined temperature by a heating current, the improvement comprising:

a planar film resistor element including a dielectric film, and a metal film sensor resistor supported on the dielectric film, the metal film having a substantial change of resistivity with temperature, a support frame having a hole extending therethrough, means for mounting the film resistor element on the support frame with the sensor resistor registered with the hole and spaced from the support frame for thermal isolation from the support frame whereby the resistor element has small thermal mass, and an airflow director on each side of the plane of the film resistor element for directing the flow of an airstream toward each side of the film resistor element at an oblique angle thereto to obtain a consistent airflow at the resistor element and a positive cooling effect by the airstream.

7. In a flow meter, a mass airflow sensor having a sensor resistor controlled to a determined temperature by a heating current, the improvement comprising:

a duct for carrying an airstream, a planar film resistor element including a dielectric film, and a metal film sensor resistor supported on the dielectric film, the metal film having a substantial change of resistivity with temperature, a thin flat planar support having an aperture larger than the metal film sensor resistor, means for mounting the film resistor element on the support with the sensor resistor over the aperture and spaced from the support for thermal isolation from the support whereby the resistor element has small thermal mass, the support being mounted in the duct along the duct axis, and means on each side of the planar film resistor element and upstream thereof to form two airflow paths converging toward the film resistor element to obtain a consistent airflow at the sensor and a positive cooling effect by the airstream.

8. In a flow meter, a mass airflow sensor having a sensor resistor controlled to a determined temperature by a heating current, the improvement comprising:

a film resistor element including a dielectric film, and a metal film sensor resistor in two portions supported on the dielectric film, the metal film having a substantial change of resistivity with temperature, support means having a wedge configuration with a pair of inclined faces, at least one hole therein defining a recess in each face, means for mounting the film resistor element on the support means with each sensor resistor portion over one of the recesses and spaced from the support means for thermal isolation from the support means whereby the resistor element has small thermal mass, and means for mounting the support means in the flow of an airstream to place each sensor resistor portion at an oblique angle to the airstream to obtain a consistent airflow at the sensor resistor and a positive cooling effect by the airstream.

* * * * *